United States Patent [19]
McKee

[11] 3,724,776
[45] Apr. 3, 1973

[54] FILM FEEDING APPARATUS
[75] Inventor: Edward S. McKee, Rochester, N.Y.
[73] Assignee: Eastman Kodak Company, Rochester, N.Y.
[22] Filed: Feb. 9, 1971
[21] Appl. No.: 113,922

[52] U.S. Cl. ...................242/195, 226/92, 242/210, 352/158
[51] Int. Cl. .............................G03b 1/02, G03b 1/58
[58] Field of Search......242/195, 180, 181, 186, 188, 242/210; 352/157, 158; 226/91, 92

[56] References Cited

UNITED STATES PATENTS

| 3,604,657 | 9/1971 | Igarashi et al. | 242/195 |
| 3,337,146 | 8/1967 | Miyauchi et al. | 242/208 |

Primary Examiner—George F. Mautz
Attorney—William H. J. Kline and G. Herman Childress

[57] ABSTRACT

Film feeding apparatus for a motion picture projector includes guide members cooperating with a hook-like member for guiding the hook member into a position in close proximity to a rotating roll of film or the like for engaging the film through an opening in a leading end portion of the film. In the illustrated embodiment the guide members are on the hook member and cooperate with flanges of a film reel for accurately positioning the hook with respect to the leading end portion of the film, thereby assuring engagement between the hook and the film and minimizing the size of the opening in the film that is required for high reliability of operation.

6 Claims, 4 Drawing Figures

PATENTED APR 3 1973 3,724,776
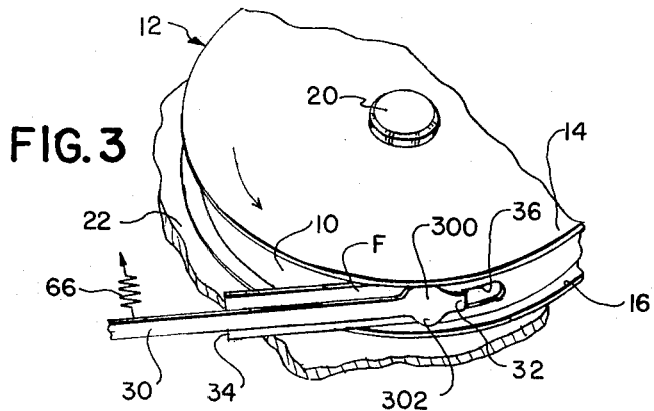
FIG. 3
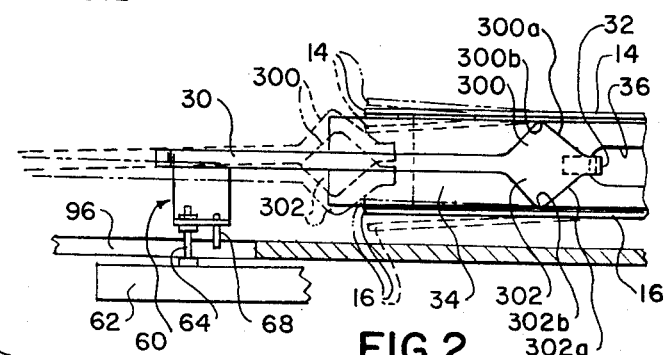
FIG. 2
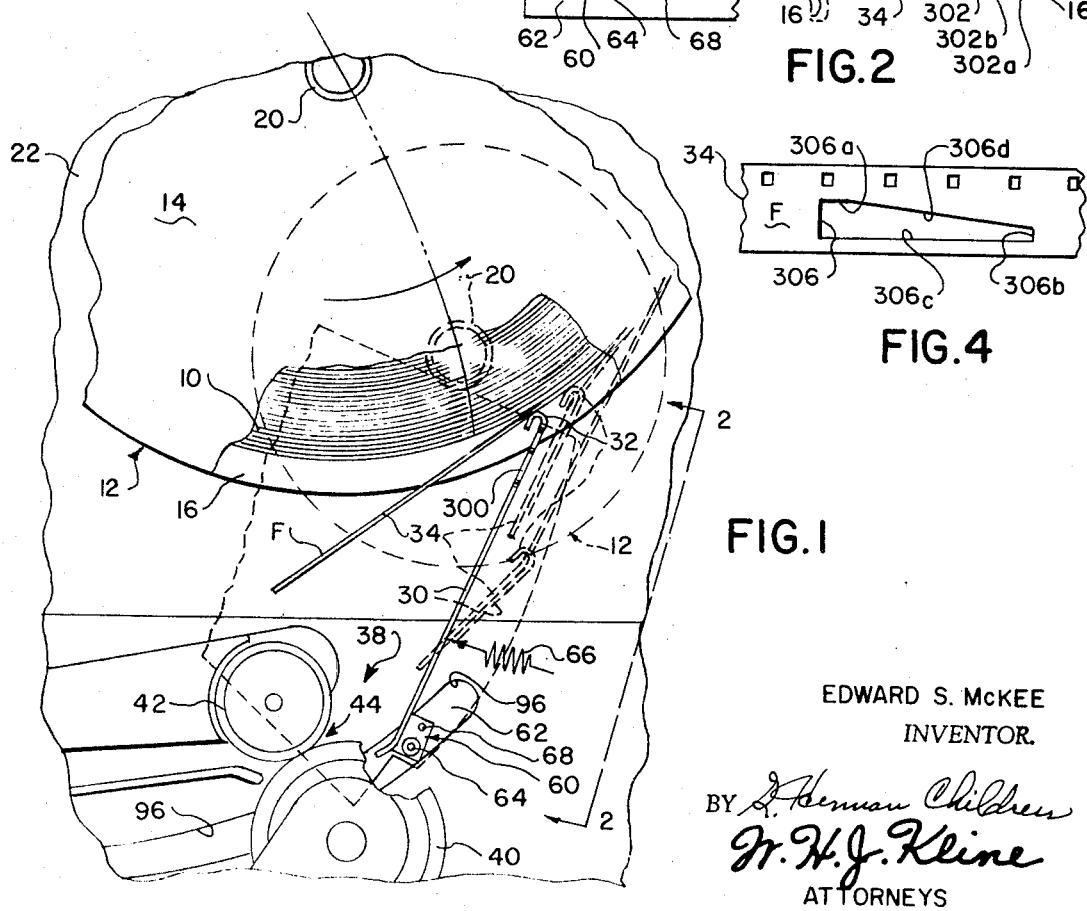
FIG. 4
FIG. 1
EDWARD S. McKEE
INVENTOR.
BY *L. Herman Childress*
*W. H. J. Kline*
ATTORNEYS

FILM FEEDING APPARATUS

CROSS-REFERENCE TO RELATED APPLICATIONS

Reference is made to the commonly assigned copending U.S. Pat. applications Ser. No. 875,819, entitled AUTOMATIC FILM THREADING DEVICE, filed Nov. 12, 1969 in the names of Gerhard Brauning and Wolfgang Ort, now U.S. Pat. No. 3,628,751, issued Dec. 21, 1971; and Ser. No. 77,959, entitled AUTOMATIC FILM STRIPPING SYSTEM, filed Oct. 5, 1970 in the names of William A. Martin and John St. Clair II.

BACKGROUND OF THE INVENTION

1. Field of Invention

This invention relates to an improved apparatus for automatically feeding film from a roll of film to self threading apparatus of a projector.

2. Description of the Prior Art

The common assigned U.S. Pat. No. 3,429,518, issued Feb. 25, 1969 in the name of E. S. McKee and entitled DEVICE FOR STRIPPING AND FEEDING STRIP MATERIAL FROM A ROLL, discloses a film feeding mechanism comprising an endless belt and a stripping finger that are selectively movable into a cartridge or the like for engaging a film roll within the cartridge. The belt drives the film roll in an unwinding direction and the finger separates the leading end of the film from the roll. The film is then guided by the belt and finger into a film gate and the film feeding mechanism is retracted from the cartridge. Various modifications to the film feeding mechanism disclosed in the McKee patent have been described in various commonly assigned patents and patent applications. For example, commonly assigned U.S. Pat. No. 3,552,683 issued on Jan. 5, 1971 in the names of J. J. Bundschuh et al, discloses one such improvement.

In the beforementioned U.S. Pat. No. 3,628,751, film feeding is achieved by use of a driven sprocket that is engageable with openings in a film strip (such as the usual sprocket holes or perforation normally provided in motion picture film) for driving film from a supply roll to self threading apparatus of a projector. The openings in the film strip are brought into engagement with the sprocket by rotating the film supply roll in a take-up direction, thereby causing the free, leading end portion of the film roll to be swung in a circular path so that it can contact the sprocket which is positioned in such path and aligned with the opening in the film.

In the beforementioned copending patent application Ser. No. 77,959 a film feeding mechanism is disclosed comprising a finger member having a hook on a free end portion thereof, the finger being movable to position the hook in close proximity to or in engagement with the outer convolution of any one of various sizes of film rolls that are rotatable about a spindle. The film has a free end portion with an elongate opening therein, and the film is engaged with the hook by rotating the film in a takeup direction when the hook is extended to its position adjacent the film roll. After engagement of the film and the hook, the hook is moved to draw the leading end of the film away from the roll and furnish it to a threading mechanism of a motion picture projector or the like. The present invention is directed to an improvement over this type of film feeding mechanism. More specifically, the present invention permits the opening in the film to be relatively small so that the opening does not significantly impair operation of the earlier film feeding mechanism, and, at the same time, the invention improves the reliability of operation of a film feeding mechanism such as disclosed in application Ser. No. 77,959.

SUMMARY OF THE INVENTION

An object of the invention is to provide an improved mechanism for feeding film from a supply roll of film in a cartridge, or from an unenclosed film roll, and more specifically, to provide such a film feeding mechanism which is highly reliable in operation and which functions reliably with film strips having relatively small openings through which part of the mechanism is to be engaged.

Another object of the invention is to provide a structurally simple film feeding mechanism adapted to engage an opening in an end of a supply of film wherein the opening in the film can be small enough to permit operation of film feeding mechanisms such as described in U.S. Pat. Nos. 3,429,518 and 3,552,683 without significantly impairing reliability of operation of film feeding mechanisms of the type disclosed in the beforementioned U.S. Pat. application Ser. No. 77,959.

Another object of the invention is to provide structurally simple film feeding mechanism that cooperates with flanges of a film reel for accurately locating the mechanism with respect to a roll of film on the reel.

In accordance with the present invention, apparatus is provided for feeding a leading end portion of a strip of web material from a roll of such material that is rotatable in a direction for taking up web material onto the roll. The web is provided with an opening in its leading end portion. The apparatus comprises a member having a hook portion adapted to enter the opening in the web strip for feeding strip material from the roll. The member is mounted for movement between (1) a first position wherein the hook portion is adjacent the roll of web material for entering the opening in the strip to couple the hook portion to the strip in response to rotation of the roll in a take-up direction and (2) a second position wherein the hook portion is separated from the roll. Guide means cooperate with the member for guiding movement of the hook portion of the member during movement of the member from its second position to its first position so that the hook portion of the member is aligned with the opening in the web material when the member is in its first position, thereby to insure coupling of the hook portion of the member with the strip of web material during rotation of the roll in a take-up direction.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a fragmentary plan view, partially broken away, illustrating a preferred specific embodiment of a film feeding apparatus of this invention, and showing the film feeding mechanism in various positions which it may assume during operation;

FIG. 2 is a view taken generally along line 2—2 of FIG. 1 and showing the film feeding mechanism engaged with film on a film reel;

FIG. 3 is a fragmentary perspective view of a portion of the apparatus shown in FIG. 2; and FIG. 4 is a fragmentary view showing an end portion of a film strip with a modified opening therein engageable with the film feeding apparatus of this invention.

DESCRIPTION OF THE PREFERRED EMBODIMENTS

Because photographic apparatus are well known, the present description will be directed in particular to elements forming part of, or cooperating more directly with, the present invention, apparatus not specifically shown or described herein being understood to be selectable from those known in the art.

In order to more clearly understand the present invention, certain structures will now be described which are also disclosed in the beforementioned U.S. Pat. application Ser. No. 77,959, reference being made to that application for a more complete explanation of such apparatus and its mode of operation. In the following description, the reference numerals used in such earlier application will be used to indicate the same or corresponding parts of the apparatus illustrated in FIGS. 1-3.

The apparatus of the present invention is operable to feed a strip of film F from a roll 10 of such film. The film roll is illustrated as being wound on a conventional film supply reel 12 having spaced reel flanges 14 and 16 at opposite sides of roll 10. The reel has an opening in a hub portion thereof for positioning the reel on a spindle 20 of a motion picture projector (for example). Reel 12 may be furnished to the projector in a cartridge (not shown). For example, the cartridge may be of the type disclosed in U.S. Pat. application Ser. No. 736,524 entitled CARTRIDGE, now U.S. Pat. No. 3,648,952, and U.S. Pat. No. 3,546,373 entitled CARTRIDGE AND MEANS FOR LOCATING A CARTRIDGE ON A PROJECTOR OR THE LIKE, both of which were filed on May 23, 1968 in the name of John J. Bundschuh. Of course, the reel also can be rotatably supported by other suitable means, such as by being mounted on a reel-supporting portion of a cartridge or cassette rather than on a spindle.

Spindle 20 projects through a mechanism plate 22. The spindle can be driven in a film take-up direction (as indicated by the arrows in FIGS. 1 and 3) through a suitable tendency drive (not shown) and, if desired, it may be positively driven in the same direction at high speed to facilitate rewinding of film onto the reel. Spindle drives for achieving such functions are well known in the art. Also, the spindle may be movable to each of a plurality of positions, two of which are shown in solid and phantom lines in FIG. 1, so that the projector can receive reels of both large and small film capacities in corresponding sized film catridges. Movement of such a spindle for accommodation of various sizes of film rolls and cartridges is disclosed in U.S. Pat. application Ser. No. 77,281, entitled CARTRIDGE LOADED PROJECTOR OR THE LIKE, filed Nov. 20, 1968 in the name of Robert J. Roman, now U.S. Pat. No. 3,583,655.

An elongate finger member 30 has an integral hook 32 on an end portion thereof. The finger and hook are movable into an extended position (as shown in solid lines in FIGS. 1-3) wherein the hook is in close proximity to or in engagement with the outer convolution of any of several sizes of film rolls that may be positioned on spindle 20. Film F has a free, leading end portion 34 that is rotated in a generally circular path in a plane between the reel flanges and just above plate 22 by driving spindle 20 in a film take-up direction. The finger member is mounted in the manner explained later so that when the hook is in its extended position, it occupies the same plane as the film end portion 34 during rotation of the film roll. As explained in detail later, the hook is guided accurately into a position with respect to the film and the reel flanges so that an elongate slot 36 in film end portion 34 is in register with hook 32 once during each revolution of the film roll for engaging the hook and the film.

Finger member 30 has a base portion 60 that is pivotally mounted on a lever 62 (positioned just below plate 22) by a pivot pin 64. A spring diagrammatically shown at 66 biases finger 30 about pin 64 in a counterclockwise direction as viewed in FIG. 1 to bring a cam follower 68 carried by base portion 60 into engagement with one side edge of a cam slot 96 in plate 22. As explained in application Ser. No. 77,959, lever 62 is movable about a pivot spaced from slot 96 for moving finger 30 toward and away from the film roll. Engagement between the cam follower and the side edge of the slot guides finger 30 during its movement toward and away from film roll 10 and, as explained in the beforementioned application, movement of the finger away from the film roll feeds the end portion 34 of film F to a film drive generally designated 38. Drive 38 includes a driven roller or puck 40 and a pressure roller or puck 42 that jointly define a nip 44 into which the film is delivered by the film feeding mechanism. Drive 38 is effective to strip the film from the finger and to deliver the film to other portions of a self threading mechanism of a projector or the like. The spring bias provided by spring 66 allows the finger member to move from the position shown in solid lines in FIG. 1 to the positions shown in phantom lines in response to contact with the outer periphery of film roll 10 or to forces exerted on the finger subsequent to engagement of the hook portion 32 with the film.

In application Ser. No. 77,959, alignment between hook portion 32 of the finger and opening 36 in the film was achieved by the mounting of the finger 30 on lever 62 and by moving the lever 62 in a path which brought the hook portion between the flanges of reel 12. While this has proved to be satisfactory in operation, it is very desirable to provide quite accurate positioning of the hook portion with respect to the film roll in order to maximize the reliability of the film feeding apparatus and to make it suitable for use with film rolls that also may be used on apparatus having film feeding mechanisms of the type described in U.S. Pat. No. 3,552,683. Also, manufacturing tolerances, wear and deviations in alignment, etc. in film reels, the spindle 20 and finger 30 can adversely affect reliability of a film feeding mechanism of the type disclosed in the earlier application Ser. No. 77,959. In this regard, reference is made to FIG. 3 which shows that the flanges 14 and 16 of a reel 12 may not be exactly parallel to each other, or may not be substantially perpendicular to the axis of rotation of the reel, or that the flanges of one reel may rotate in a slightly different path from flanges of another reel mounted on a spindle 20. For these reasons, the flanges may describe a cone of revolution that has a substantial thickness at the radially outer periphery of the reel flanges. Since the film roll is confined between the reel flanges, the opening 36 in the film will tend to move up and down (as viewed in FIG. 2) with the reel flanges, thereby making engagement between the opening 36 and hook 32 somewhat difficult to achieve. Reliability of such engagement can be increased by simply widening opening 36 or reducing the width of hook portion 32. This is not entirely satisfactory, however, because increasing the width of opening 36 may affect adversely the reliability of film feeding mechanisms of the type shown in U.S. Pat. No. 3,552,683, and narrowing of hook portion 32 may result in tearing of the film at the end of opening 36.

The problem mentioned hereinbefore have been overcome by the present invention. More specifically, a film feeding mechanism of the present invention is provided with guide means for accurately positioning hook 32 with respect to opening 36 in the film. As illustrated in the drawings, the guide means comprises guide members shown in the form of wings or flanges 300 and 302 which are integrally formed with finger 30 and project laterally from opposite side edges of finger 30 closely adjacent the hook portion 32. The finger construction illustrated comprises a relatively thin shank portion between the guide means and base portion 60, and a relatively wide portion defined by the guide means. The shank portion is preferably somewhat flexible due to its thinness, the material from which it is made, or its mounting on lever 62. Guide members 300 and 302 are generally triangular in shape, including tapered forward edge portions 300a and 302a, respectively, which diverge rearwardly away from hook portion 32 to rounded edges or peaks 300b and 302b. The distance between peaks 300b and 302b is less than the minimum distance between the inner surfaces of reel flanges 14 and 16, and finger 30 is mounted and moved so that edge 302a normally contacts flange 16 as the finger moves toward reel 12. As a result of this structure, movement of the finger toward opening 36 in the film roll is guided accurately by the guide means to position hook portion 32 exactly in line with opening 36 even though the reel flanges are somewhat misaligned with respect to the finger 30. More specifically, ordinarily reel flanges 14 and 16 and finger 30 are positioned with respect to each other so that as the finger member is moved toward the film roll, the leading edge portion 302a of the guide member will contact the reel flange 16 to bring the hook portion 32 into alignment with the opening 36 by lowering the reel flanges and/or raising finger member 30, the exact reaction depending upon the relative forces exerted by the reel flanges and the finger member against each other. Similarly, positioning of the hook portion relative to opening 36 is self correcting due to operation of the guide means if the reel flanges and finger are positioned relative to each other so that edge 300a first contacts flange 14. Because of the exact positioning of hook portion 32 with respect to opening 36, engagement between the film and the hook portion occurs with substantially 100 percent reliability even when the reel flanges are grossly misaligned or when the width of opening 36 is just slightly larger than the width of hook portion 32.

As shown in FIG. 4, film strip F can have an opening 306 in the end portion thereof which includes a large generally rectangular portion 306a nearest the free end of the film strip and another much narrower end portion 306b at the opposite end of the opening. The end portions of opening 306 are joined at the bottom by an edge 306c that is substantially parallel to the unperforated side edge of the film and another edge portion 306d that tapers from the narrow end portion 306b to the wider portion 306a of the opening in the film. This particular shape of opening has been found especially desirable for use with film rolls that are to be handled by the apparatus of the present invention as well as film feeding mechanisms such as shown in U.S. Pat. No. 3,552,683. With oblong openings such as shown at 36 the finger member of the film feeding mechanism of the type shown in U.S. Pat. No. 3,552,683 can enter the opening and engage the rear end portion of the opening. The relative width of opening 36 at the rear end then causes the film to buckle under the force exerted by the drive belt shown in that patent. The shape of opening shown at 306 and FIG. 4, on the other hand, prevents buckling of the film since the film is relatively wide in relation to the width of the opening at the end 306b of the opening. Of course, other shaped openings can be used, if desired, depending upon the strength of the film, the type of film feeding mechanisms to be used with the film, and other practical considerations.

The invention has been described in detail with particular reference to preferred embodiments thereof, but it will be understood that variations and modifications can be effected within the spirit and scope of the invention.

I claim:

1. Apparatus for feeding a leading end portion of a strip of web material from a roll of such material located in a plane, the roll being rotatable in such plane in a direction for taking up web material onto the roll, and the web having an opening in its leading end portion, the apparatus comprising:

a flexible member having a hook portion adapted to enter the opening in the web strip for feeding strip material from the roll;

means mounting said member for movement between (1) a first position wherein the hook portion is adjacent the roll of web material for entering the opening in the strip to couple the hook portion to the strip in response to rotation of the roll in a take-up direction and (2) a second position wherein the hook portion is separated from the roll;

means coupled to said member for moving said member between its first position and its second position; and guide means cooperating with said flexible member for guiding movement of the hook portion transversely relative to the plane of the roll and the direction of movement of said flexible member during movement of said flexible member from its second position to its first position so that the hook portion of said member is aligned with the opening in the web material when said member is in its first position, thereby to insure coupling of the hook portion of said member with the strip of web material during rotation of the roll in a take-up direction.

2. Apparatus as set forth in claim 1 wherein said guide means comprises at least one flange on said flexible member adjacent the hook portion of said flexible member, said flange being offset from said hook portion.

3. Apparatus for feeding a leading end portion of a strip of web material from a roll of such material, the roll being rotatable in a direction for taking up web material onto the roll, and the web having an opening in its leading end portion, the apparatus comprising:

a member comprising an elongate shank portion and a hook portion adapted to enter the opening in the web strip for feeding strip material from the roll;

means mounting said member for movement between (1) a first position wherein the hook portion is adjacent the roll of web material for entering the opening in the strip to couple the hook portion to the strip in response to rotation of the roll in a take-up direction and (2) a second position wherein the hook portion is separated from the roll;

means coupled to said member for moving said member between its first position and its second position; and guide means comprising two guide members connected to said member and projecting outwardly from said member, the outer extremities of said guide members being spaced apart by a distance that exceeds the width of said shank portion and said hook portion to guide movement of said hook portion of said member during movement of said member from its second to its first position so that said hook portion of said member is aligned with the opening in the web material when the member is in its first position, thereby to insure coupling of the hook portion of said member with the strip of web material during rotation of the roll in a take-up direction. --.

4. Apparatus as set forth in claim 3 wherein each of said guide members has an edge portion adjacent said hook portion of said member, said edge portions diverging away from said hook portion.

5. Apparatus for feeding a leading end portion of a strip of web material from a roll of such material, the roll being disposed between two spaced flanges of a reel or the like and being rotatable in a direction for taking up web material onto the roll, and the web having an opening in its leading end portion, the apparatus comprising:

a member having a hook portion adapted to enter the opening in the web strip for feeding strip material from the roll;

means mounting said member for movement between (1) a first position wherein the hook portion is adjacent the roll of web material for entering the opening in the strip to couple the hook portion to the strip in response to rotation of the roll in a take-up direction and (2) a second position wherein the hook portion is separated from the roll;

means coupled to said member for moving said member between its first position and its second position; and guide means comprising a first guide member connected to said member adjacent said hook portion, said guide member being engageable with one flange for locating said hook portion relative to the roll during movement of said member from its second position toward its first position. --.

6. Apparatus as set forth in claim 5 wherein said guide means comprises a second guide member connected to said member adjacent said hook portion, said guide members being generally triangular in shape and having edge portions adjacent said hook portion that diverge away from said hook portion.

* * * * *